United States Patent [19]

Habegger

[11] Patent Number: 4,976,572
[45] Date of Patent: Dec. 11, 1990

[54] METHOD AND AUTOMATIC MACHINE FOR MACHINING COILED STOCK

[76] Inventor: Harold Habegger, Sous-Graitery 10, CH-2738 Court, Switzerland

[21] Appl. No.: 339,561

[22] Filed: Apr. 13, 1989

[30] Foreign Application Priority Data

Apr. 15, 1988 [CH] Switzerland .................... 1401/88

[51] Int. Cl.[5] ............................................. B23C 3/04
[52] U.S. Cl. ...................................... 409/132; 409/73; 409/157; 10/4; 10/87; 10/90; 140/1; 29/561; 51/72 R
[58] Field of Search ............... 409/132, 73, 72, 172, 409/174, 198, 202, 203, 221, 157, 162, 131, 165, 166, 199; 29/27 C, 37 R, 37 A, 38 B, 561, 566.1; 140/1; 81/2.7, 9.51; 10/2, 4, 9, 21, 87, 89, 90; 76/19.1; 51/103 WA, 103 TF, 80 R, 80 A, 81 A, 88, 324, 729, 323, 21 ER, 76 R, 215 E, 288

[56] References Cited

U.S. PATENT DOCUMENTS

| 1,899,221 | 2/1933 | Ward et al. ............... 409/162 X |
| 3,691,879 | 8/1972 | Blake ........................ 82/127 X |
| 4,324,162 | 4/1982 | Vehara ...................... 82/127 X |
| 4,366,734 | 1/1983 | Aeschbacher ............. 82/127 X |
| 4,483,052 | 11/1984 | Stuart ....................... 409/157 X |

FOREIGN PATENT DOCUMENTS

| 862702 | 1/1953 | Fed. Rep. of Germany . |
| 903396 | 2/1954 | Fed. Rep. of Germany . |
| 906037 | 3/1954 | Fed. Rep. of Germany . |

Primary Examiner—Z. R. Bilinsky
Assistant Examiner—Robert Schultz
Attorney, Agent, or Firm—Pollock, Vande Sande & Priddy

[57] ABSTRACT

The automatic machine works on coiled stock to produce a series of workpieces. It comprises a spindle arranged to turn around its axis, but only somewhat more than through an angle of 360°, between two fixed angular limits. The tools consist of shaped milling cutters or grinding wheels which machine surfaces of revolutions on the workpieces.

3 Claims, 4 Drawing Sheets

METHOD AND AUTOMATIC MACHINE FOR MACHINING COILED STOCK

BACKGROUND OF THE INVENTION

1. Field of the Invention.

This invention relates to automatically machining coiled stock, i.e. a thread-like material wound to form a spool.

2. Description of the Prior Art.

Stock, after having been unwound from the spool and possibly been passed between staggered rollers to straighten it, has, as yet, been fed to a fixed collet chuck by a stock pusher which, at the beginning of every machining cycle, pushes through the open collet chuck a sufficient length of stock to produce a workpiece. At the end of the feeding by the stock pusher, the collet chuck is closed again and machining a workpiece starts. The corresponding operations are carried out by means of a rotary disc mounted in front of the collet chuck and carrying on its face opposite the collet chuck tools movable in a radial direction.

If the workpieces to be manufactured have outer cylindrical surfaces with a diameter of one millimeter and less, it is no longer possible to let the tools of the known machines work at their cutting speed. The disc carrying the tools should, indeed, rotate at speeds incompatible with its inertia and the unbalanced masses due to the movable tools. At the admissible rotary speeds of said disc, the output, however, suffers although the coiled stock dispenses with the conventional loading of stock bars.

SUMMARY OF THE INVENTION

The invention aims to permit machining workpieces out of coiled stock with tools operating at their optimal cutting speed and while avoiding high rotary speeds, thereby increasing the output.

For that purpose, with the method according to the invention, rotary shaped milling cutters or grinding wheels are moved substantially radially against the free end portion of the stock while causing that free end portion to turn to and fro about itself between two limits set apart from each other through an angle substantially equal to 360°.

It is also an object of the invention to provide an automatic machine for performing the method according to the invention. That machine comprises a spindle adapted to grip the stock near its free end portion and to turn to and fro about its axis between two limits set apart from each other through an angle substantially equal to 360°. That machine also comprises at least one rotary shaped milling cutter or grinding wheel adapted to move substantially radially against the free end portion of the stock to machine the side surfaces of the workpieces and to sever the latter from the stock.

The turning motions of the spindle obviously produce torsions of the stock. On the level of the collet chuck of the spindle, the turning motions of the latter only twist the stock at most through an angle substantially equal to 360° and, in some instances, even through a maximum angle substantially equal to 180° in one and the other direction from a neutral position which is equidistant from the two limits. The material of the stock can go through the deformations involved by the mode of operation disclosed without any damage, provided that the spool of coiled stock or the straightening device, if such a device is used, be sufficiently far away from the machine.

It will be observed that if the spindle moves in one second from one of its angular limits to the other one, which may correspond to the manufacture of one workpiece, it rotates at a speed of sixty revolutions a minute. With automatic machine tools, especially automatic lathes, such a rotational speed is, however, very slow so that overheating and dilation problems are eliminated.

Moreover, a milling cutter having a diameter of 50 millimeters, for instance, has a circumferential length somewhat above 150 millimeters. Now, if such a milling cutter makes a thousand revolutions a minute, which is still a low speed, the linear speed of the cutting edge of its peripheral teeth is 150 meters a minute, thus constituting, as a matter of fact, a high cutting speed on a substantially still workpiece. By way of comparison, in order that the cutting edge of a cutter or chisel reaches the same cutting speed on a stock having a diameter of 1 millimeter, this cutter or chisel should rotate around the stock at a speed of about 45,000 revolutions a minute!

To machine the side faces of a series of workpieces, it is recommended to use milling cutters or grinding wheels in the form of circular discs, the edge of which, when cut by an axial plane, has the shape to be given to the workpieces, and to let these milling cutters or grinding wheels rotate around axes parallel to that of the spindle. Two shafts carrying milling cutters or grinding wheels are preferably located on opposed sides of the spindle. According to the shape of the side surfaces of the workpieces to be manufactured, it may be advantageous to mount two or more milling cutters or grinding wheels on the same shaft, each of which simultaneously machines some portion along the side surface of the workpieces. Milling cutters or grinding wheels having a large diameter with respect to that of the workpieces are preferably used, especially when the workpieces have a small diameter, because the larger the milling cutters or the grinding wheels are, the slower they have to be rotated in order to obtain the optimal cutting speed.

Another object of the invention is to provide a machine capable of forming screw threads by milling. Therefore, the spindle is arranged for moving in an axial direction at least through a distance equal to the pitch of the screw thread to be milled and control means are associated with the spindle to move it in the axial direction.

In this case, the milling cutter has a thickness corresponding to the length of the screw thread to be manufactured and it is provided with circular rows of teeth, the cross-section of which corresponds to that of every convolution of the screw thread to be manufactured. As the spindle makes one revolution on itself, its control mechanism moves it in an axial direction through a distance equal to the pitch of the screw thread to be manufactured. When the spindle has turned on itself a little more than one revolution, for instance from one of its angular limits to the other one, the screw thread is ended.

Still further objects of the invention will become apparent to those skilled in the art in the course of the following description.

BRIEF DESCRIPTION OF THE DRAWINGS

One embodiment of the machine according to the invention, which also illustrates one example of carrying out the method according to the invention, is represented diagrammatically and only by way of example in the accompanying drawings.

In the drawings.

DESCRIPTION OF THE PREFERRED EXAMPLE AND EMBODIMENT

Figure 1:
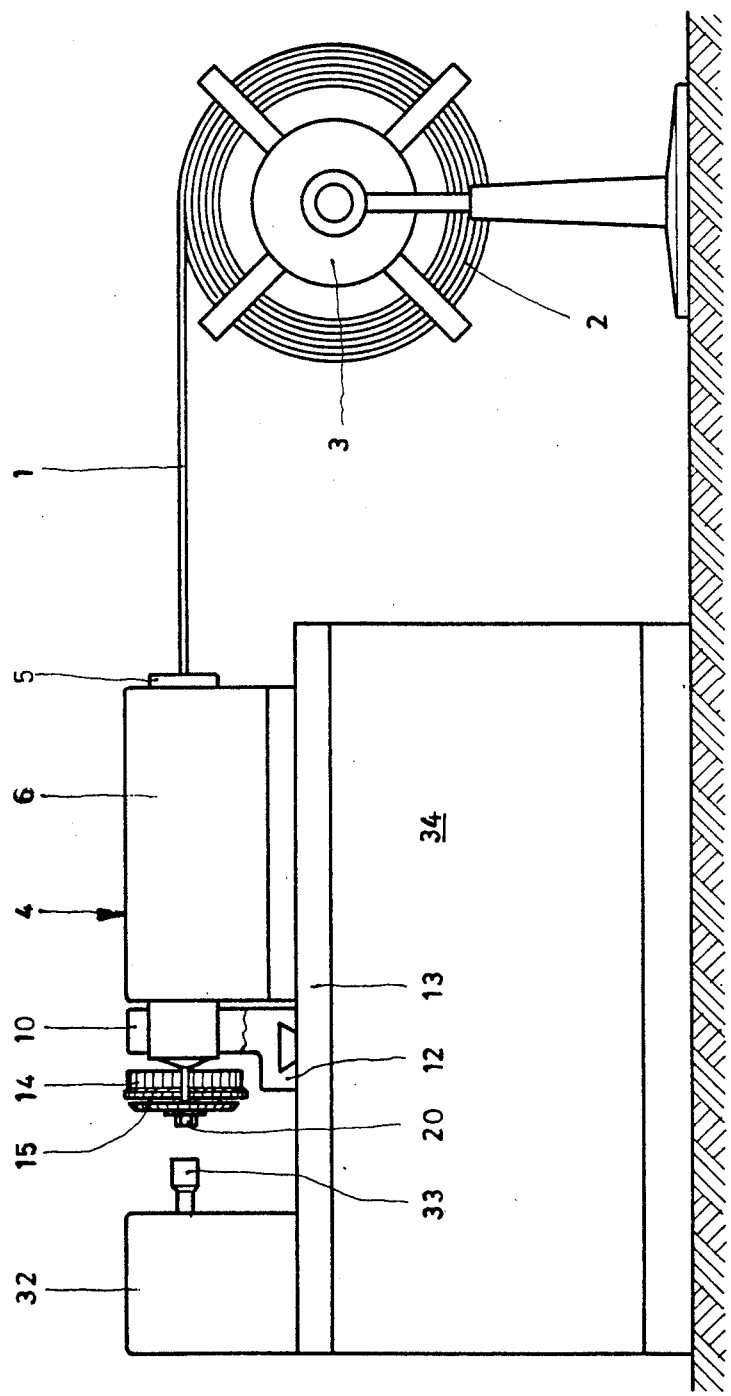
FIG. 1 is an elevational view of one side of the embodiment.

The machine represented is intended for machining coiled stock, i.e. a thread-like material 1 which is wound to form a spool 2 on a drum 3. The latter is located behind the machine 4 at the proper height to deliver the stock 1 to a spindle 5 of the machine.

The spindle 5 is adapted to turn to and fro through an angle slightly greater than 360° between two fixed limits. Spindle 5 can obviously also turn somewhat more than 180° in one and the other direction from a so called neutral angular position which is equidistant from the two limits. For this purpose, spindle 5 is mounted in a fixed headstock 6. The spindle 5 could just as well be journalled in two uprights fixed to the machine frame, one of these uprights being located near the front end of the spindle 5 and the other one near the rear end of the spindle. The spindle 5 comprises a conventional collet chuck 7, which is controlled by conventional means (not shown).

Stock 1 can be fed to the open collet chuck 7 of spindle 5, when the latter is equidistant from its angular limits. Before reaching the collet chuck 7, the stock 1 passes through a conventional stock pusher (not shown) which is controlled by also conventional means (not shown) well known to those skilled in the art. The stock pusher is movable in axial direction between two stops set apart from each other through a distance adjusted in function according to the length of the workpieces to be manufactured. During machining of one workpiece, the stock pusher is in its rearmost position. At the end of the machining operations of a workpiece, the collet chuck 7 opens and the stock pusher moves forward up to its foremost position. It encompasses the stock 1 strongly enough to drive the latter during its forward motion. When the stock pusher has reached its forward stop, the collet chuck 7 is closed again and the stock pusher returns into its rearmost position while sliding along the stock 1.

To machine a screw out of the free end portion of the stock, which has thus been fed beyond the collet chuck, the machine comprises two shafts 8, 9 (FIGS. 2 and 3) which are parallel to the axis of the spindle 5 and located on opposite sides thereof. The shafts 8, 9 are rotatory mounted in uprights 10, 11 of a slide 12 (FIG. 1) movable in a direction perpendicular to the axis of spindle 5 on a bed 13 of machine 4. Other arrangements of shafts 8, 9 are of course possible. They could for instance be mounted on swinging arms pivoted on the framework of machine 4. The shafts 8, 9 are driven in rotation in a conventional manner well known to those skilled in the art by motors (not shown). Two milling cutters 14, 15 are set on shaft 8 and two further milling cutters 16, 17 are set on shaft 9 (FIG. 3). The milling cutters set on the same shaft are separated from each other by a spacer 18, 19. The milling cutters 14–17 are axially held in place on their shaft by nuts 20, 21.

Figure 4:
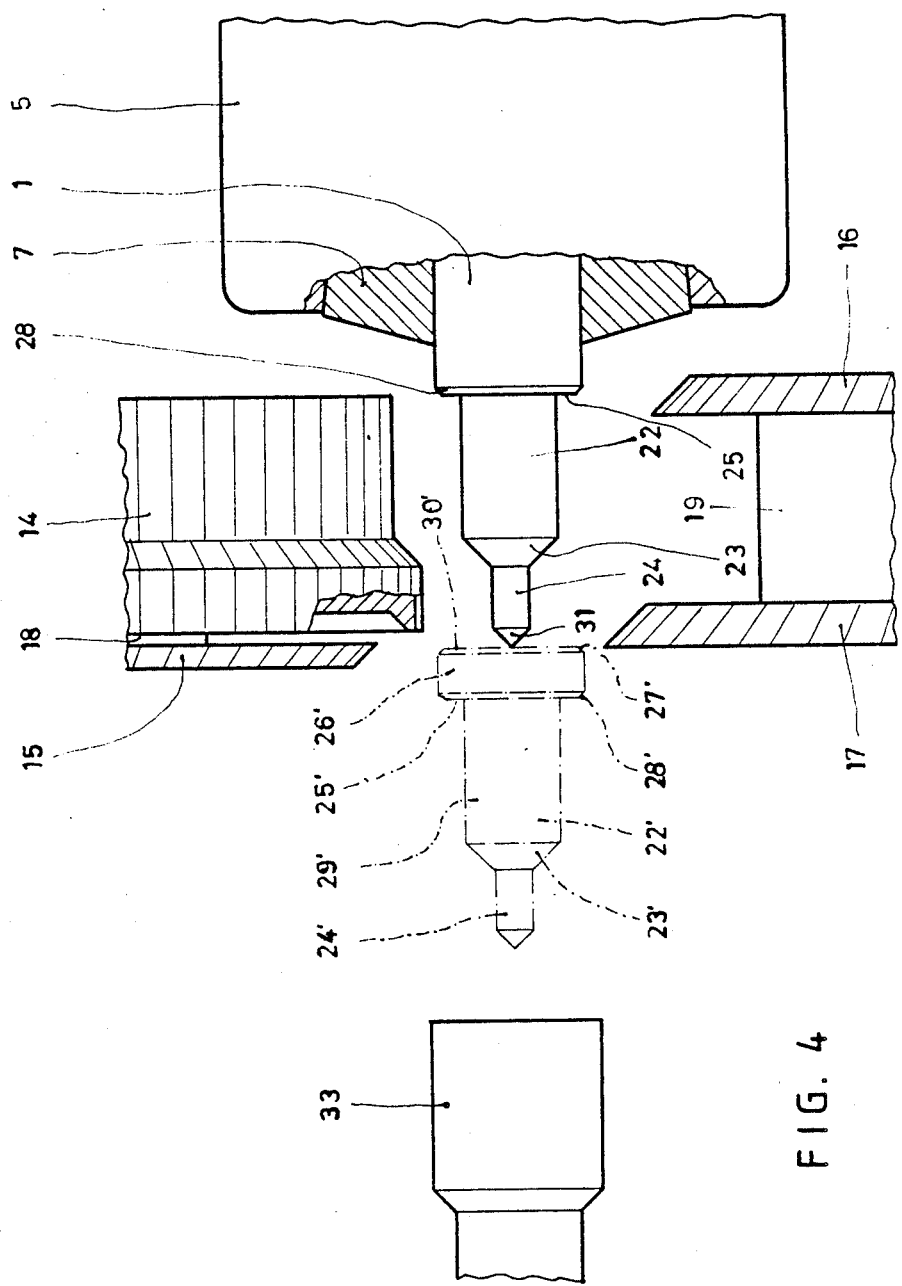
FIG. 4 is a plan view of some parts of the embodiment during machining of a screw provided with a pivot.

As shown in FIG. 4, the milling cutter 14 has a shaped contour. It forms the cylindrical surface 22, 22' of the screws, which has to be provided with a screw thread, as well as the truncated conical portion 23, 23' and the pivot 24, 24' of these screws while forming the front face 25, 25' of the head 26'. For its part, the milling cutter 15 chamfers the rear edge 27' of the heads 26' of the screws. The milling cutter 16 similarly chamfers the forward edge 28, 28' of the heads 26' of the screws and the milling cutter 17 severs the ended screw 29' while forming the rear surface 30' of the head of screw 29' and the tip 31 of the following screw.

The machine 4 further comprises a screwing attachment 32 (FIG. 1) which is provided with a threading die 33 to form the screw thread of the screws. The machine components are altogether mounted on a base 34.

As indicated above, the collet chuck 7 is closed when spindle 5 is in neutral position, i.e. in an angular position equidistant from the limits. Once collet chuck 7 is closed, spindle 5 turns somewhat more than 180° in the clockwise direction (FIG. 2) up to one of its angular limits. This turning motion generates a torsion of stock 1. The stock is, however, capable of supporting that strain without damage. The drum 3 need only be set far enough away from the machine 4.

Figure 2:
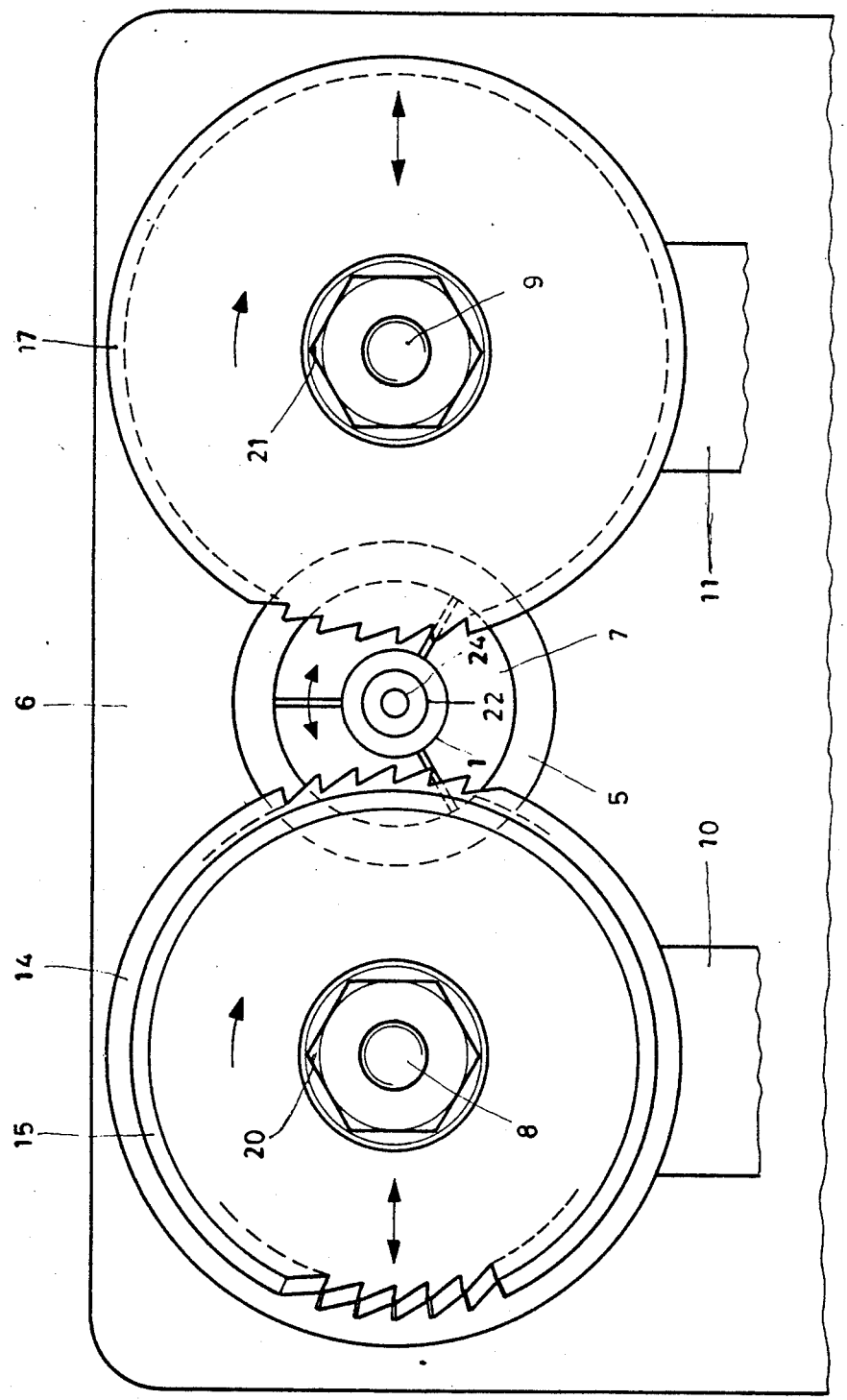
FIG. 2 is a front view on a larger scale of a part of the embodiment from the left of FIG. 1.
Figure 3:
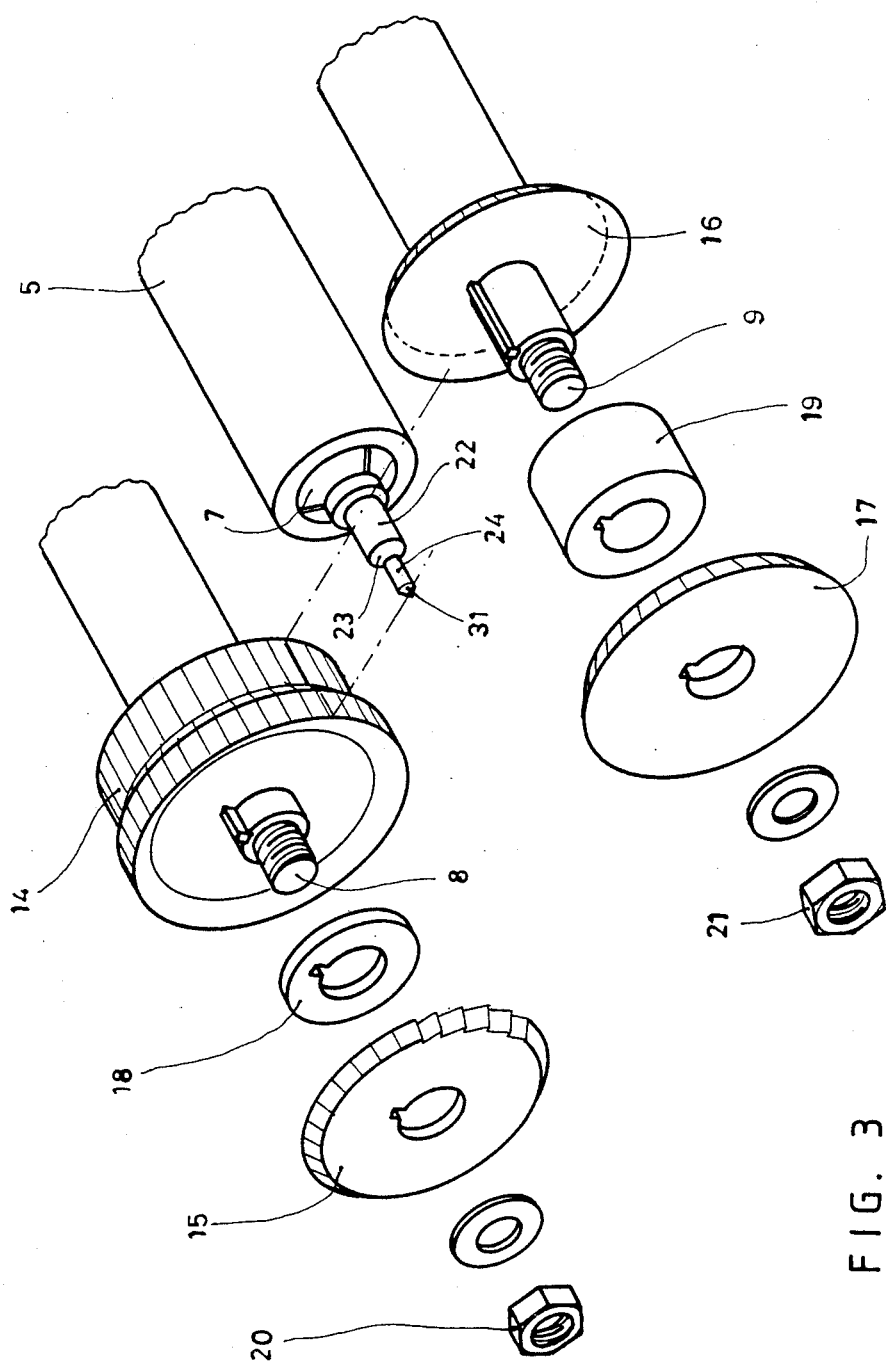
FIG. 3 is an exploded perspective of some components of the embodiment.

When the spindle 5 has reached its stop, slide 12 moves shaft 8 to the right in FIG. 2 so as to bring the milling cutter 14 in operating position. When this milling cutter is fully engaged in the material of the stock 1, the spindle 5 starts turning in the counterclockwise direction (FIG. 2) up to its other limit. Thus it turns somewhat more than 360° so that the milling cutter 14 forms the cylindrical surface 22, the portion 23 and the pivot 24 round the stock portion protruding from the collet chuck 7. If there is some risk for the stock to bend under the pressure of milling cutter 14, it will be held by means well known to those skilled in the art.

It will be observed that screw 29', which is represented in dot-and-dash lines in FIG. 4, is still integral with the stock 1 through the pivot 24. During the time the milling cutter 14 carries out the operation disclosed, the milling cutter 15 chamfers the edge 27' of screw 29'.

The milling cutter 14 can do its work in a single pass. It may, however, be advantageous not to let milling cutter 14 move up to the specified size at once, thus carrying out a first rough pass and then to carry out a small finishing pass by causing spindle 5 to turn clockwise up to the corresponding limit.

When the milling cutters 14 and 15 have ended their work, slide 12 moves them away from the stock by sliding to the left up to the position of the milling cutters represented in FIG. 2. The threading die 33 is then operated in order to form a screw thread on the cylindrical surface 22'. After that operation, the slide 12 moves to the left (FIG. 2) so as to bring the milling cutters 16, 17 into operating position. These milling cutters operate while spindle 5 moves from the limit which it previously reached, up to the other limit.

While milling cutter 17 forms the rear face 30' of the head 26' of screw 29' represented in dot-and-dash lines in FIG. 4 and severs that screw, milling cutter 16 chamfers the front edge 28 of the head of the following screw. When the milling cutters 16, 17 have ended their work, they are brought back to the position of FIG. 2 and the spindle 5 returns in neutral position. The operation cycle is ended. The collet chuck opens to permit feeding a new length of stock 1.

The screws described could clearly just as well be manufactured by means of shaped grinding wheels instead of milling cutters 14 to 17. The choice between grinding wheels and milling cutters will chiefly be made in accordance with their function and the nature of the material of stock 1 and also, of course, in view of the costs and the working life of these tools.

It would naturally be possible to prevent the machine from running light by bringing spindle 5 from its neutral position up to one of its limit positions before starting the machining operations, and then bringing spindle 5 from a limit position back to its neutral position after the machining operations. For that purpose, the stock 1 would only need to be introduced into spindle 5 and fed therethrough when the spindle is in one of its limit positions. In this case, the spindle would, of course, twist stock 1 through a complete revolution on the level of its collet chuck 7 to ensure the desired machining operations. Under these conditions, the machining operations would be carried out simply by causing spindle 5 to turn from one of its limit positions to the other one and then to turn back into the first limit position. Twisting stock 1 through a complete revolution does not produce permanent deformations of the stock provided that spool 2 of coiled stock and possibly the straightening device are sufficiently far away from the machine.

At the end of the disclosed machining operations, the screws are not ready. They have to be resumed to slot their head.

Screws of some qualities require a milled screw thread. The method and machine according to the invention permit the manufacture of such screws. For that purpose, a milling cutter having a thickness corresponding to the length of the screw thread to be machined need only be substituted for milling cutter 14. The milling cutter in question is provided with circular rows of teeth having a cross-section corresponding to that of the different convolutions of the screw thread to be produced. The spindle 5 must then be mounted so as to be able to move in its axial direction through a distance at least equal to the pitch of the screw thread. The latter will be formed after one complete revolution of the spindle 5 provided that the latter is moved axially as it turns.

In this case, the head of the screws can be formed in front of the screw thread instead of being formed behind the screw thread as in the example represented in the drawings. The mode of operation has the advantage that the screw head can be slotted before severing the screw from the stock. Therefor the screw head will advantageously be inserted into the circular opening of a collar plate and provided with a diametrical slot in its front face. By turning then the slotted screw head within the collar plate, burrs resulting from the slotting operation will be eliminated. Before severing the ended workpiece, spindle 5 obviously will have to be moved backwards in its axial direction in order to remove the screw head from the collar plate.

The machine disclosed is not only advantageous for the manufacture of screws; it may serve for the manufacture of other workpieces, for instance, plugs of electronic elements to be inserted in sockets of printed circuits. It can obviously also be used to manufacture relatively long workpieces with respect to their diameter. Such workpieces need only be held in a manner well known to those skilled in the art.

Since the spindle of the machine according to the invention turns at a very low speed when it makes one revolution a second, that speed can be increased and therewith the output of the machine without having to deal with overheating and dilation problems.

The operation of the machine according to the invention can naturally be controlled by cams or numerically in a conventional manner.

What is claimed is:

1. A method of machining workpieces out of a thread-like stock which has been wound up into a coil from one end to provide a free end portion at the other end, said method comprising the steps of:
   unwinding from said coil said free end portion and an adjacent length of said coiled stock corresponding to a distance at which a machine for machining said workpieces is located apart from said coil and any device associated therewith for straightening said coiled stock;
   introducing said free end portion of said coil into said machine, said machine having at least one rotating and shaped milling cutter or grinding wheel;
   moving said milling cutter or grinding wheel in a direction substantially perpendicular to the axis of said free end portion so that said milling cutter or grinding wheel engages said free end portion; and,
   causing said free end portion to turn about its axis between two limits set apart through an angle of at least 360° while said milling cutter or grinding wheel is engaged with said free end portion and said free end portion is integral with said coiled stock; said adjacent length of unwound stock being sufficient to prevent said turning from damaging said stock.

2. A method according to claim 1, wherein said machine includes a spindle having means for gripping a section of said free end portion, and wherein said method includes introducing said free end section into said gripping means and causing said spindle to rotate about the axis of said free end portion between said two limits.

3. A method according to claim 2 further comprising the step of moving said spindle to cause said free end portion of said stock to move along its axis in a direction parallel to the rotational axis of said at least one rotating milling cutter or grinding wheel while said free end portion turns about its axis between said two limits.

* * * * *